(No Model.)

D. FULLER.
STORM DOOR FOR WAGONS.

No. 543,007. Patented July 23, 1895.

Witnesses.
Lauritz N. Möller
Charles A Harris

Inventor.
Daniel Fuller
by Alban Andrén, his atty.

UNITED STATES PATENT OFFICE.

DANIEL FULLER, OF TOPSFIELD, MASSACHUSETTS.

STORM-DOOR FOR WAGONS.

SPECIFICATION forming part of Letters Patent No. 543,007, dated July 23, 1895.

Application filed December 7, 1894. Serial No. 531,123. (No model.)

*To all whom it may concern:*

Be it known that I, DANIEL FULLER, a citizen of the United States, and a resident of Topsfield, in the county of Essex and State of Massachusetts, have invented new and useful Improvements in Portable Storm-Doors for Wagons, of which the following, taken in connection with the accompanying drawings, is a specification.

This invention relates to improvements in portable storm-doors for covered wagons, such as express and market wagons, &c.; and it has for its object to effectually close the forward end of such wagon in rainy or cold weather and in such a manner as to afford ingress and egress to and from the front end of the wagon, as will hereinafter be more fully shown and described, reference being had to the accompanying drawings, wherein—

Figure 1:
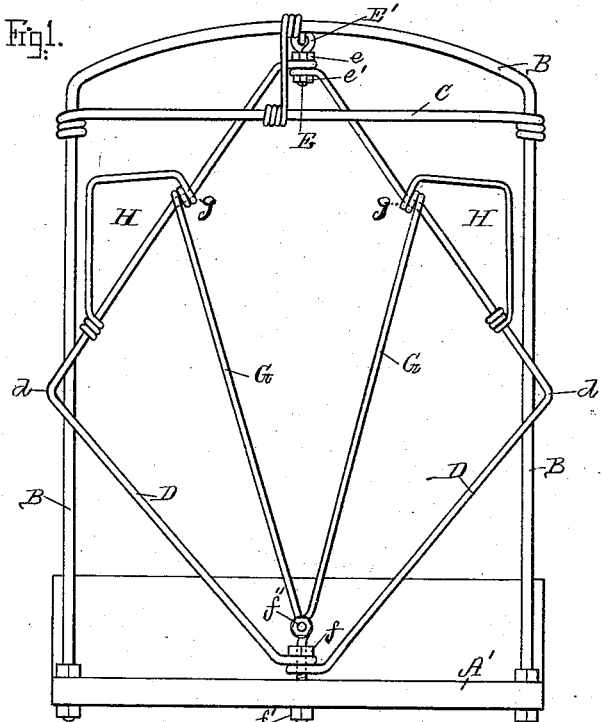
Figure 3:
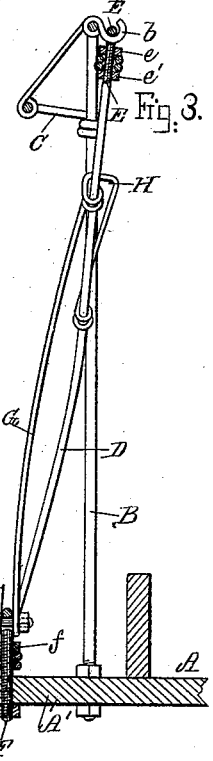
Figure 2:
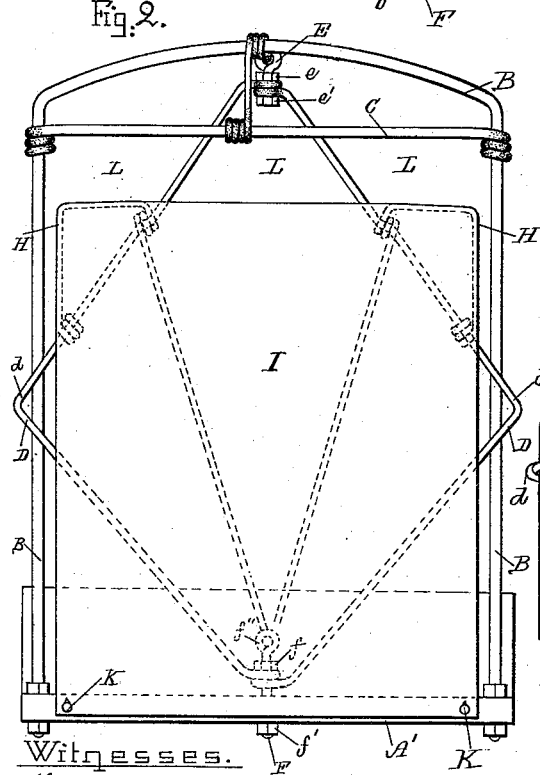
Figure 4:
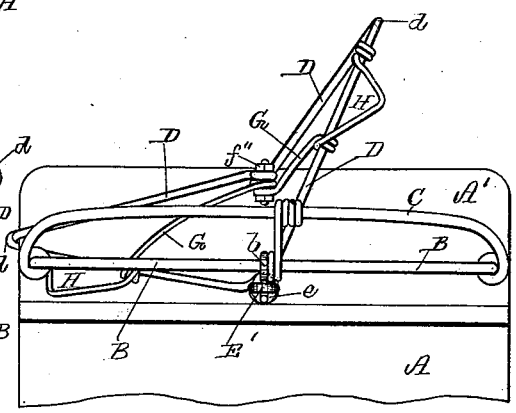

Figure 1 represents a front elevation of the portable storm-door shown closed and with the protecting flexible cover removed. Fig. 2 represents a similar view of the invention with the flexible cover attached to the pivoted door-frames. Fig. 3 represents a central vertical section of Fig. 1, and Fig. 4 represents a top plan view showing one of the pivoted door-frames held open.

Similar letters refer to similar parts wherever they occur on the different parts of the drawings.

A in the drawings represents the bottom of a wagon-body, on which A' represents the foot-board, as usual.

B represents the arched upright frame secured to the front portion of the wagon-body, and it serves as a support for the top and side covers of the wagon, as usual.

C represents the hood-supporting brace secured to the upper part of the frame B, as is common in wagons of this kind.

D D represent the angular skeleton door-frames pivoted in their upper and lower ends, respectively, preferably on the bolts E F, as shown. The upper bolt E is provided with nuts or collars $e$ $e'$ above and below the pivoted portions of the upper ends of the frames D D, so as to loosely connect the latter to said bolt E. The said bolt E terminates at its upper end as a hook or eye E', which is detachably hung onto the middle portion of the arched part of the frame B, and preferably onto a hook $b$, secured to said arched part of the frame B, as shown. The lower pivot-bolt F is preferably provided with a nut or collar $f$ and with a fastening-nut $f'$, as shown in Figs. 1, 2, and 3. The bolt F has a perforation in its upper end adapted to receive a bolt or rivet $f''$, onto which the lower ends of the springs G G are secured, as shown. The upper ends of said springs are suitably attached to the door-frames D D at $g$ $g$, as shown in the drawings.

To the upper portions of the door-frames D D are secured skeleton corner-pieces H H, which are preferably made in one piece with the respective springs G G; but this is not essential.

The corners $d$ $d$ of the door-frames D D are made to extend somewhat beyond or outside of the uprights B B, as shown in Figs. 1, 2, and 4, and serve as stops to prevent the said door-frames from being forced by the springs G G back of said uprights when the storm-door is closed, as shown.

I in Fig. 2 represents the flexible cover, which may be made of any suitable waterproof material, and it is secured to the door-frame corners H H in its upper end, and its lower end may be detachably secured, preferably by means of hooks or buttons K K, to the foot-board or dasher of the wagon, as shown in Fig. 2.

L L L in Fig. 2 are sight-openings above the cover I to enable the driver to look forward in driving the team.

When not needed for use, the portable storm-door may be detached from the front of the carriage simply by removing the nut $f'$ from the lower fastening-bolt F and detaching the upper eye E' from its suspension-hook $b$, when the door-frame and its covering are easily removable and may be stored away in the wagon or stable or other place, as may be most practical and convenient.

The wagon may be entered at either side of the front end simply by swinging one of the door-frames D forward against the influence of its spring G, as shown in the right-hand portion of Fig. 4.

As soon as the driver or other person in charge of the wagon releases his hold on the pivoted door-frame it will be automatically swung into the closed position. (Shown in the left-hand side of Fig. 4 and in Figs. 1, 2, and 3.)

What I wish to secure by Letters Patent and claim is—

The herein described portable storm door for wagons consisting of a pair of pivoted skeleton frames D, D, pivoted at their upper and lower ends to the wagon front or its connections combined with self closing springs G, G, and a cover I, substantially as and for the purpose set forth.

In testimony whereof I have signed my name to this specification, in the presence of two subscribing witnesses, on this 19th day of November, A. D. 1894.

DANIEL FULLER.

Witnesses:
ALBAN ANDRÉN,
THEKLA ANDRÉN.